Sept. 2, 1947.  H. A. CARTWRIGHT  2,426,860
APPARATUS FOR HEATING VISCOUS MATERIAL
Original Filed Aug. 1, 1941  2 Sheets-Sheet 1
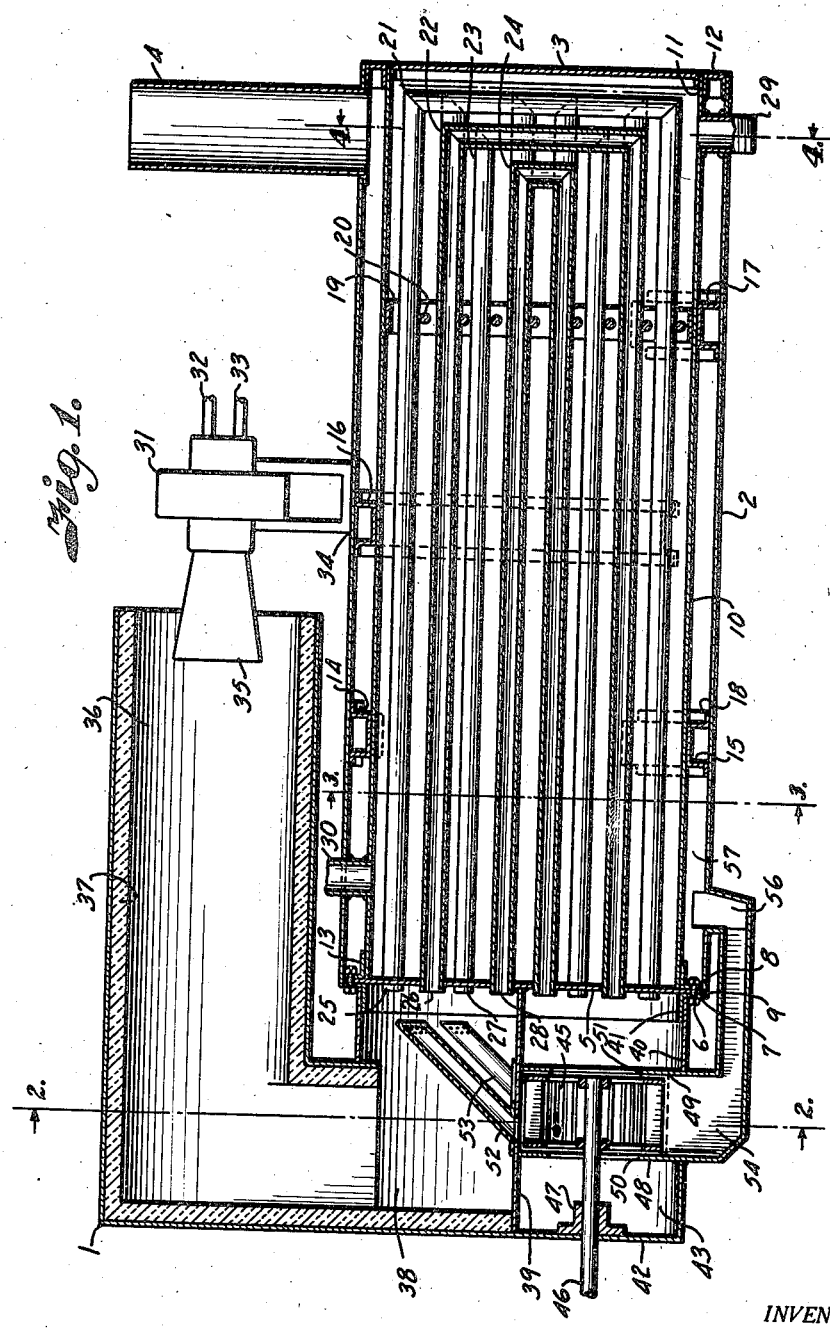
INVENTOR:
Horace A. Cartwright.
BY
Paul E. Mullendore
ATTORNEYS.

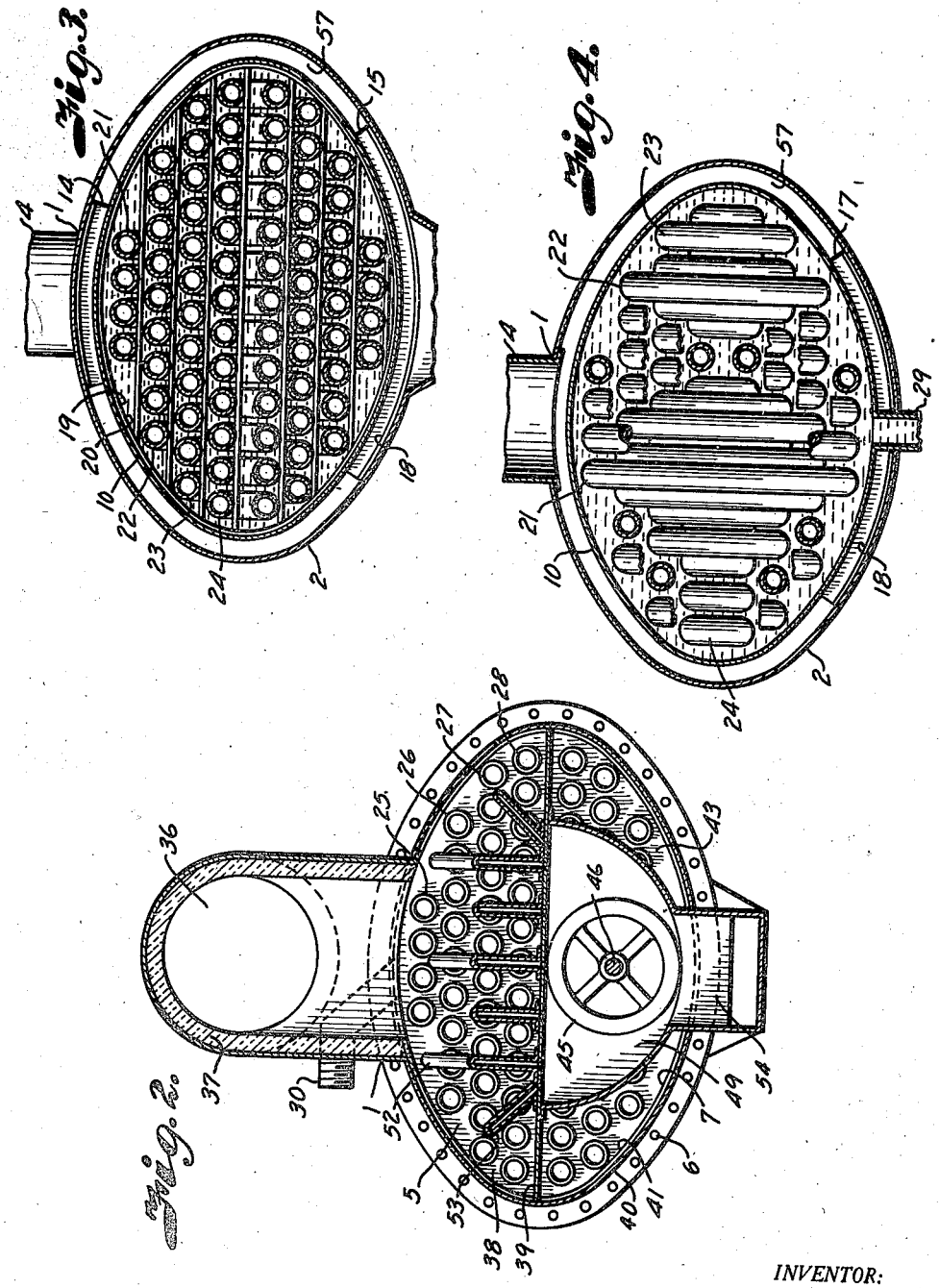

Patented Sept. 2, 1947

2,426,860

UNITED STATES PATENT OFFICE 2,426,860

APPARATUS FOR HEATING VISCOUS MATERIAL

Horace A. Cartwright, Galion, Ohio

Original application August 1, 1941, Serial No. 405,082. Divided and this application September 11, 1943, Serial No. 501,999

5 Claims. (Cl. 257—235)

This invention relates to apparatus for heating viscous material and is a division of my copending application Serial No. 405,082, filed August 1, 1941, now Patent No. 2,239,741, issued January 18, 1944.

This invention more particularly relates to apparatus for heating asphalt and similar material wherein the asphalt is so treated as to facilitate its transfer from storage receptacles, such as tank cars, to distributors, such as truck tanks for use on roads and the like.

The principal objects of the present invention are to provide a convenient, relatively economical and highly efficient heating apparatus; to protect the material being treated from excessively high temperatures; to provide for mixing heating gases and products of combustion in an efficiently useful manner; to provide for thorough circulation of heating gases throughout heating portions of the apparatus; to allow for expansion and contraction of heater elements relative to each other; to provide for recirculation of a portion of the products of combustion; to provide a forced circulation of heating gases through the apparatus; and to provide improved elements and arrangements thereof in an apparatus of the character and for the purpose noted.

In accomplishing these and other objects of the invention I have provided improved details of structure, the preferred form of which is illustrated in the accompanying drawings wherein:

Fig. 1 is a longitudinal vertical section through a heating apparatus embodying the present invention, showing the relation of the blowers and flues relative to each other.

Fig. 2 is a vertical transverse section through the heater substantially on the line 2—2, Fig. 1.

Fig. 3 is a vertical transverse section through the heater substantially on the line 3—3, Fig. 1.

Fig. 4 is a transverse section through the heater substantially on the line 4—4, Fig. 1.

Referring more in detail to the drawings:

1 designates a heating apparatus for heating viscous materials, such as asphalt, and may be mounted on a trailer or other suitable support (not shown). The heater preferably includes an outer shell 2 which is preferably of elliptical cross-section as shown in Figs. 2 to 4 inclusive. One end of the shell is closed by a wall 3 and is also provided with an exhaust gas stack 4, preferably adjacent the wall 3 and on the top of the shell 2. The opposite end of the shell 2 is preferably provided with a wall 5 that is secured adjacent its periphery, by fastening devices 6, between vertical flanges of angle members 7 and 8. The angle members and the peripheral edge of the wall 5 are suitably secured to the end 9 of the shell 2, preferably in such a manner that the wall 5 is removable.

Concentrically arranged within the shell 2 is a shell 10, which is enclosed at its ends by the walls 3 and 5, the shell 10 being supported at its end 11 on an annularly arranged channel 12 and, at its inner end, on the horizontally arranged flanges 13 of the angle member 8. The shell 10 is supported intermediately of its ends on spaced baffles 14, 15, 16 and 17.

The baffles 14 to 17 are preferably of generally U-shape in cross-section, the arms of which are fixed in position, as by welding the flanges 18 thereon, to the shell 2. The baffles are further staggered preferably substantially as shown. Secured inside the shell 10 and preferably adjacent the baffle 17 is a ring 19 provided with spaced transverse ties 20 in order to form supports on which flues 21, 22, 23 and 24 may slidably rest.

The flues are preferably of U-shape and have arms opening, as at 25, 26, 27 and 28, through apertures in the plate 5 that otherwise closes the shells 2 and 10.

It will be apparent from Fig. 1 that material to be heated may be pumped or otherwise delivered from a suitable source to an inlet 29 of the heater, preferably consisting of a duct extending through the lower portion of the shells 2 and 10 adjacent the wall 3. The material passes through the inlet duct and into the interior of the shell 10 around the flues 21 to 24 where it is heated. The heated material passes out of the heater by an outlet duct 30 extending through the upper portion of the shells 10 and 2 for suitable delivery to a distributor or other container (not shown).

Heat is applied to the tubes or flues 21 to 24 of the heater to make the asphalt or other viscous material flow more freely. This is preferably accomplished by providing a burner 31, which is suitably provided with fuel through pipes 32 and 33. The burner may be of any suitable type and is mounted on the shell 2 as at 34. A nozzle 35 leads from the burner into an inlet stack 36 that may be insulated, as at 37. The stack 36 directs the hot gases and products of combustion of the burner 31 into a chamber 38, which chamber is defined by a horizontal partition 39 dividing the arms of the flues 21 to 24 into inlet and outlet portions relative to the hot gases in the chamber 38. An annular plate 40 that is suitably secured to the horizontal flange 41 of the angle 7 surrounds the partition 39 and cooperates with the end wall 42 of the insulated inlet stack 36 in forming the chamber 38 and 43. It is apparent that the upper series of arms of the U-shaped flues open into the chamber 38 for admitting gases from the burner and that the lower series of the arms of the flues empty into the chamber 43.

In order to utilize the maximum heat values of the products of combustion of the burner 31, a combination suction fan and blower 45 is preferably mounted in the chamber 43, as by mounting the drive shaft 46 of the blower rotatably in a bearing 47 mounted in the wall 42. The blower or fan 45 may be driven by any suitable prime mover (not shown). The blower or fan 45 is arranged in a casing consisting of side walls 48 and 49 that are suitably secured in spaced relation to the partition 39 and the wall forming plate 42. The walls 48 and 49 have openings 50 and 51 therein for allowing gases in the chamber 43 to be sucked into the fan. The partition 39 has outlets 52 and 53 from the fan chamber, which outlets direct gases in the chamber 43 back into the chamber 38 for recirculation through the U-shaped tubes. The fan or blower chamber has an outlet 54 from the chamber 43, which leads, as shown at 56, into the space 57 between the shells 2 and 10.

The pressure created by the blower fan 45 forces some of the hot gases in the chamber 43 into such space 57 and, in a tortuous path, over and around the baffles 14, 15, 16 and 17, to a point adjacent the end wall 3 of the heater from which point the spent gases of combustion and relatively cool air may escape through the stack 4 to atmosphere.

The operation of an apparatus constructed as described is as follows:

Material to be heated is delivered into the heater through the inlet 29. The burner 40 is then ignited to supply hot air or other gases to the flues opening into the chamber 38 and the blower or fan 45 is energized to force hot air emitted from the flues into the chamber 43 back into the chamber 38 for recirculation, and also through the conduit 55 into the space 57 between the coaxially arranged heater shells. The baffles between the heater shells cause the hot gases to traverse a tortuous course throughout the entire length of the heater and thus utilize substantially all of the heat values in the gases, after which they are dissipated or exhausted to atmosphere through the stack 4.

Relative viscosity of the asphalt is reduced in the heater and from the heater the asphalt passes through the outlet duct 30 to a distributor or other container. An advantage of the present arrangement is that the heater may be left full of material when allowed to cool and reheated without injury to the heater or material. Even if the burners are turned low there is no danger of coking for with this recirculation principle, with the burner turned low and the blower at high speed, the temperature of the gases entering the flues can be cut as low as steam, which will not harm the material with no circulation of the material.

It is apparent, therefore, that the present apparatus provides a convenient, relatively economical and highly efficient manner of heating viscous materials, such as asphalt.

What I claim and desire to secure by Letters Patent is:

1. In an apparatus of the character described, a heater comprising spaced concentric shells, a plurality of flues in the inner shell of said heater having inlet and outlet portions, a compartment at the inlet end of said flues having a partition dividing said compartment into upper and lower chambers, means for supplying products of combustion from the upper chamber to the inlet portions of said flues, means for circulating said products of combustion from the outlet portions of said flues through said lower chamber to said upper chamber, means for connecting the space between said heater shells with the outlet portions of said flues, an outlet from said space, and spaced baffles in said space between said shells for causing said products of combustion to traverse a tortuous course through said space.

2. In an apparatus of the character described, a heater comprising spaced concentric shells, a plurality of flues in the inner shell of said heater having inlet and outlet portions, a compartment at the inlet end of said flues having a partition dividing said compartment into upper and lower chambers, means for supplying products of combustion from the upper chamber to the inlet portions of said flues, means for circulating said products of combustion from the outlet portions of said flues through said lower chamber to said upper chamber, means for connecting the space between said heater shells with the outlet portions of said flues, an outlet from said space, spaced baffles in said space between said shells for causing said products of combustion to traverse a tortuous course through said space, and means on at least one of said baffles for slideably supporting said flues.

3. In an apparatus of the character described, a heater comprising spaced concentric shells and end walls for said shells, a plurality of flues in the inner shell of said heater having inlet and outlet portions the end wall of the inner shell supporting the inlet ends of said flues being removable, a header chamber located at the inlet end of said flues, a partition in said chamber between the inlet and outlet flues, means for supplying products of combustion to the inlet portions of said flues, means for circulating said products of combustion from the outlet portions of said flues to the inlet portions thereof through said chambers, means connecting the space between said heater shells with the outlet portions of said flues, an outlet for discharge of spent gases of combustion from said space, baffles in said space, and means on said baffles for slideably supporting said flues.

4. In an apparatus of the character described, a heater comprising spaced concentric shells and end walls for said shells, a plurality of flues in the inner shell of said heater having inlet and outlet portions, a header chamber located at one end of said flues, said flues extending into said chamber, a partition in said chamber, means for supplying products of combustion to the inlet portions of said flues, means for circulating said products of combustion from the outlet portions of said flues to the inlet portions thereof through said chambers, means connecting the space between said heater shells with the outlet portions of said flues, an outlet for discharge of spent gases of combustion from said space, baffles in said space arranged in staggered relation for causing said products of combustion to traverse a tortuous course through said space, and means on one of said baffles for slideably supporting said flues.

5. In an apparatus of the character described, a heater comprising spaced concentric shells, a plurality of flues in the inner shell, end walls for said outer shell, the inner end wall being removable and providing a support for the inner end of the flues, means for supporting the outer ends of the flues, a header chamber at one end of said heater, a partition in said chamber providing an upper and lower chamber, said flues having inlet and outlet portions, means for supplying products of combustion to the inlet portions of said flues, means for circulating said products of combustion from the outlet portions of said flues to the inlet portions thereof through said chambers, means connecting the space between said heater shells with the outlet portions of said flues, an outlet for discharge of spent products of combustion from said space, and spaced baffles in said space between said shells for causing said products of combustion to traverse a tortuous course through said space.

HORACE A. CARTWRIGHT.

REFERENCES CITED

The following references are of record in the file of this patent:

UNITED STATES PATENTS

| Number | Name | Date |
|---|---|---|
| 978,769 | Massie | Dec. 13, 1910 |
| 1,537,908 | Willmann | May 12, 1925 |
| 1,941,365 | Patterson et al. | Dec. 26, 1933 |
| 1,840,836 | Davis, Jr. | Jan. 12, 1932 |
| 1,927,215 | Peebles | Sept. 19, 1933 |
| 2,093,232 | Coulter | Sept. 14, 1937 |
| 476,089 | Stillwell | May 31, 1892 |
| 1,123,207 | Hawkins | Dec. 29, 1914 |
| 1,908,547 | Simons | May 9, 1933 |